United States Patent
Shor et al.

(10) Patent No.: US 10,069,607 B2
(45) Date of Patent: Sep. 4, 2018

(54) COMMON PUBLIC RADIO INTERFACE, CPRI, LANE CONTROLLER AND METHOD OF OPERATING THEREOF

(71) Applicant: FREESCALE SEMICONDUCTOR, INC., Austin, TX (US)

(72) Inventors: Roi Menahem Shor, Tel Aviv (IL); Avi Gal, Ra'Anana (IL); Avraham Horn, Givath Shmuel (IL)

(73) Assignee: NXP USA, Inc., Austin, TX (US)

( * ) Notice: Subject to any disclaimer, the term of this patent is extended or adjusted under 35 U.S.C. 154(b) by 203 days.

(21) Appl. No.: 15/092,338

(22) Filed: Apr. 6, 2016

(65) Prior Publication Data

US 2017/0294994 A1    Oct. 12, 2017

(51) Int. Cl.
| | |
|---|---|
| *H04L 12/50* | (2006.01) |
| *H04L 5/00* | (2006.01) |
| *H04W 72/04* | (2009.01) |
| *H04W 72/08* | (2009.01) |
| *H04L 27/26* | (2006.01) |

(52) U.S. Cl.
CPC ........ *H04L 5/0007* (2013.01); *H04L 27/2607* (2013.01); *H04W 72/044* (2013.01); *H04W 72/087* (2013.01)

(58) Field of Classification Search
CPC ........ G06F 11/07; G06F 11/14; G06F 11/141; G06F 12/00; G06F 13/00
See application file for complete search history.

(56) References Cited

U.S. PATENT DOCUMENTS

2014/0241186 A1    8/2014    Garcia

FOREIGN PATENT DOCUMENTS

| EP | 1039370 B1 | 10/2005 |
| WO | 2014108750 A1 | 7/2014 |

OTHER PUBLICATIONS

Freescale; "SmartDSP Operating System—User Guide"; pp. 168-193 (chapters 4.7-4.8), Nov. 23, 2015.
Texas Instruments; "KeyStone I Architecture Antenna Interface 2 (AIF2) Users Guide"; pp. 190-215 (chapters 7.11.3.6.1-7.13.6), Nov. 2010—Revised Feb. 2015 .

*Primary Examiner* — Alvin Zhu

(57) ABSTRACT

The present application relates to a Common Public Radio Interface, CPRI, lane controller and a method of operating thereof. The CPRI lane controller comprises a transaction counter, a symbol counter and a comparator. The transaction counter is provided for maintaining a current aggregated transactions' size, $Size_{trans}$, representative of an accumulated size of DMA transactions performed by a DMA controller in response to symbols transferred on a CPRI link from or to the CPRI lane controller. The symbol counter is provided for maintaining a current aggregated expected symbols' size, $Size_{exp}$, representative of an accumulated size of a sequence of transferred symbols and a currently transferred symbol. The comparator is configured to issue a symbol awareness signal, SAS, in case the current aggregated transactions' size, $Size_{trans}$, exceeds the current aggregated expected symbols' size, $Size_{exp}$.

20 Claims, 8 Drawing Sheets

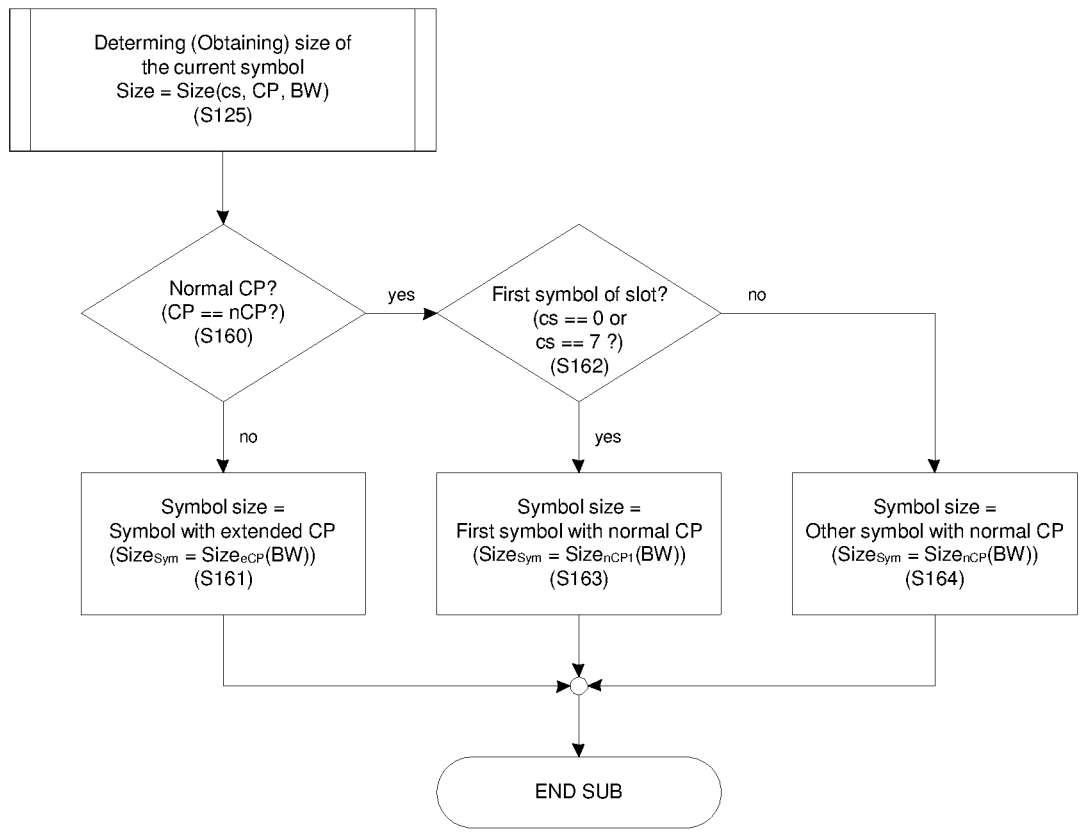
FIG. 6: cont.

COMMON PUBLIC RADIO INTERFACE, CPRI, LANE CONTROLLER AND METHOD OF OPERATING THEREOF

FIELD OF THE INVENTION

The present invention relates to a common public radio interface, CPRI, lane controller. In particular, the present invention relates to a common public radio interface, CPRI, lane controller indicating the transfer of an OFDMA symbol. More particular, the present invention relates to a common public radio interface, CPRI, lane controller enabling efficient bandwidth management in a processing.

BACKGROUND

The increased use of smartphones and other mobile devices using internet applications, video calls and e-mail is driving an unprecedented increase in world-wide wireless network traffic. From a Network operator's perspective, the key factors in driving wireless network topologies are their ability to meet demands for bandwidth, user capabilities as well as quality of service, QoS. Achieving the required capacities and fulfilling the quality of service, QoS, requirements depend on multiple factors, such as proximity of the users relative to the base station of the transceivers, the numbers of users in a cell, data throughputs and patterns as well as core network capabilities.

In conventional cellular networks macrosites can be installed on e.g. roof tops or at designated cell sites that typically have the base band units with the transceivers and RF power amplifiers in a cabinet enclosure while the antenna resides for instance on a tower mast. In such a conventional network the cabinet can be connected using a coaxial cable to the antenna on the antenna mast. This is the most common cell site approach for mobile cellular networks.

In LTE (Long Term Evolution) networks or LTE-A (Long Term Evolution Advanced) networks, the network architecture is transformed by the introduction of remote radio heads, RRH, which can be connected to a base station BS via fiber optic cables. The network can employ macro or micro base stations, the same as a traditional cellular site, but instead of having a conventional tall antenna mast, fiber optic cables can be used to distribute the base station signals for a group of antennas placed remotely in outdoor or indoor locations where required.

A common public radio interface, CPRI, forms a protocol interface between a radio equipment control, REC, and a radio equipment, RE, in a wireless network. The station is in a conventional wireless network located adjacent to the antenna in a small cabinet at the base of the antenna tower. Finding suitable sites can be a challenge because of the footprint required for the cabinet, a possible need for structural reinforcement of roof tops as well the availability of primary and back-up power sources. The common public radio interface, CPRI interface, allows the use of a distributed architecture where base stations containing the radio equipment control REC can be connected to remote radio heads RRH via wireless fiber links that carry the CPRI data. This architecture makes it possible that the remote radio heads RRH containing the radio equipment RE can be situated in environmentally challenging locations. The base stations containing the radio equipment control REC can be located centrally in less challenging locations where footprint, climate and power availability can be managed more easily. The CPRI data is transmitted in a downlink DL by the base station to the radio equipment RE and received in an uplink UL by the base station from the radio equipment RE.

The CPRI has been developed to aim for the radio interface standard of WCDMA (wideband code division multiple access) of UMTS (universal mobile communication system). Accordingly, using CPRI interface for public land mobile networks e.g. LTE/LTE-A having a signal organization structure different form the radio interface standard of WCDMA or UMTS poses problems in signal processing, in particular in case the signal processing should be performed on a predefined record of signal data out of a serial data stream with unknown data record boundaries, at first. For instance, the signal processing of LTE/LTE-A signals has to be performed on the set of IQ data representing a complete OFDMA signal. However, the IQ data relating to a complete OFDMA signal is not identifiable from the data stream framed to be transmitted through a CPRI link.

SUMMARY

The present invention provides a Common Public Radio Interface, CPRI, lane controller and a method of operating thereof as described in the accompanying claims. Specific embodiments of the invention are set forth in the dependent claims. These and other aspects of the invention will be apparent from and elucidated with reference to the embodiments described hereinafter.

BRIEF DESCRIPTION OF THE DRAWINGS

The accompanying drawings, which are incorporated herein and form a part of the specification, illustrate the present invention and, together with the description, further serve to explain the principles of the invention and to enable a person skilled in the pertinent art to make and use the invention.

DETAILED DESCRIPTION

Figure 1:
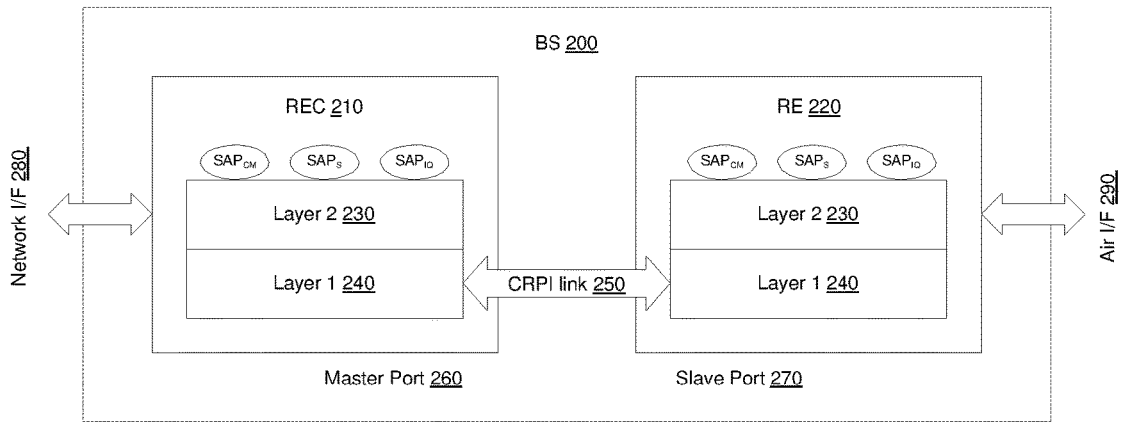
FIG. 1 schematically illustrates a block diagram of a radio base station system using an interconnecting CPRI link.
Figure 2:
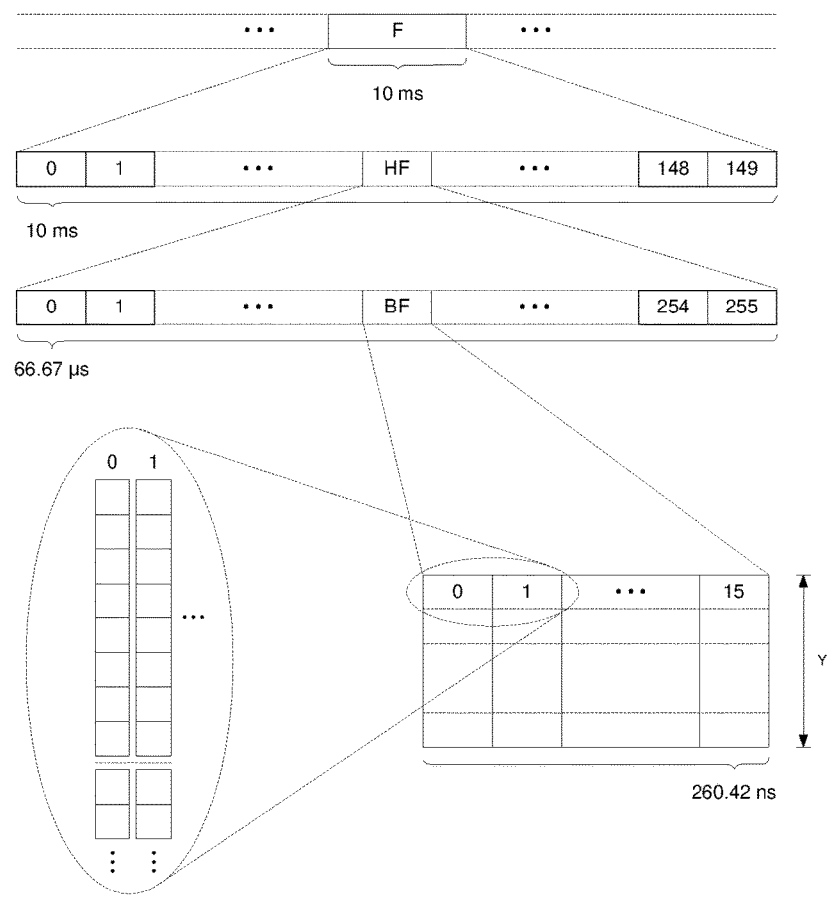
FIG. 2 schematically illustrates the frame structure of common public radio interface, CPRI, used for transmission on optical or electrical links in form of serialized data stream.

Embodiments of the present disclosure will be described below in detail with reference to drawings. Note that the same reference numerals are used to represent identical or equivalent elements in figures, and the description thereof will not be repeated. The embodiments set forth below represent the necessary information to enable those skilled in the art to practice the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Referring to FIG. 1, a block diagram of a radio base station system using an interconnecting CPRI link according to an example of the present invention is schematically illustrated. CPRI defines the layer 1 and layer 2 protocols for the transfer of user plane, C&M (Control & Management) as well as synchronization information between REC ("Radio Equipment Controller") and RE ("Radio Equipment") as well as between two REs ("Radio Equipments"). The data flows carried can be summarized as follows:

Control Plane: Control data flow used for call processing via the $SAP_{CM}$ ("Service Access Point Control & Management").

Management Plane: This data is management information for the operation, administration and maintenance of the CPRI link and the nodes via the $SAP_{CM}$ ("Service Access Point Control & Management").

User Plane: Data that has to be transferred from the radio base station to the mobile station and vice versa via the $SAP_{IQ}$ ("Service Access Point In-phase and Quadrature").

Synchronization: Data flow which transfers synchronization and timing information between nodes via the $SAP_S$ ("Service Access Point In-phase and Quadrature"), A more detailed list of types of information flows is as follows:

a) IQ Data: User plane information in the form of in-phase and quadrature modulation data (digital baseband signals).

b) Synchronization: Synchronization data used for frame and time alignment.

c) L1 In-band Protocol: Signaling information that is related to the link and is directly transported by the physical layer. This information is required, e.g. for system start-up, layer 1 link maintenance and the transfer of time critical information that has a direct time relationship to layer 1 user data. d) C&M data: Control and management information exchanged between the control and management entities within the REC and the RE. This information flow is given to the higher protocol layers.

e) Protocol Extensions: This information flow is reserved for protocol extensions.

f) Vendor Specific Information: This information flow is reserved for vendor specific information.

FIG. 1 shows a radio base station system ("BS") 200 with an REC 210 coupled to an RE 220 by a CPRI link. Three data service access points ("SAP") are shown. The control plane and management plane data is mapped to a Service Access Point $SAP_{CM}$. There is an associated $SAP_{CM}$ at the RE side. There are also SAPs for synchronization (SAPs) and for IQ data ($SAP_{IQ}$). For radio base stations with a suitable functional decomposition, the user plane data is transported in the form of IQ data. Several IQ data flows can be sent via one physical CPRI link. Each IQ data flow reflects the data of one antenna for one carrier, the so-called antenna-carrier (AxC). For radio base stations with other functional decompositions, the user plane data may not be IQ data. A protocol stack for layer 1 (protocol stack level 230) and layer 2 (protocol stack level 240) is shown and the CPRI link 250 is shown at the layer 1 level 230, between a master port 260 at the REC 210, and a slave port 270 at the RE 220.

The functional split between REC and RE, can take various forms. The REC 210 is concerned with the Network Interface 280 transport, the radio base station control and management as well as the digital baseband processing. The RE 220 provides via an air interface 290 the analogue and radio frequency functions such as filtering, modulation, frequency conversion and amplification. An overview on the functional separation between REC 210 and RE 220 is given in the CPRI specification. A functional split of base stations ("BS") 200 that is different from this section is not precluded by the CPRI specification.

The synchronization part of the interface can include mechanisms to provide precise frame timing information from the REC 210 to the RE 220. The frame timing information can be recovered on the RE 220 in order to achieve the timing accuracy requirements as described below. The RE 220 can forward frame timing information transparently when forwarding from a slave port 270 to all the master ports 260. The frame timing information is allocated to the service access point SAPs. Notably CPRI provides a requirement for Round Trip Delay Accuracy according to the supported radio standards.

The REC 210 can provide an access towards a radio access network of a public land mobile network. For the downlink (i.e., from REC 210 to RE 220), the REC 210 can handle such operations as channel coding, interleaving, spreading, scrambling, adding of physical channels, controlling transmit power of each physical channel, frame and slot signal generation. For the uplink (i.e., from RE 220 to REC 210), the REC 210 can handle such operations as channel de-coding, de-interleaving, de-spreading, de-scrambling, signal distribution to signal processing units, detection of feedback information for transmit power control, and signal to interference ratio measurement.

The RE 220 serves the air interface to the user equipment. The user equipment unit, or mobile station, is not illustrated here. The RE 220 provides the analogue and radio frequency functions such as filtering, modulation, frequency conversion and amplification. For the downlink, the RE 220 can perform operations such as digital to analogue conversion, up conversion, on/off control of each carrier, carrier multiplexing, power amplification and limiting, antenna supervision, and RF filtering. For the uplink, the RE 220 can perform operations such as analogue to digital conversion, down conversion, automatic gain control, carrier de-multiplexing, low noise amplification, and RF filtering.

Thus, the REC 210 may be understood to comprise radio functions of the digital baseband domain, whereas the RE 220 may be understood to comprise analogue radio frequency functions. The functional split between both parts can be done in such a way that a generic interface based on In-Phase and Quadrature ("IQ") data can be defined.

CPRI is an easy-to-use IQ data interface for various cellular standards such as WCDMA, LTE, LTE-A, etc. The goal of the interface is to use one physical connection for the IQ data, radio unit management, control signaling, and synchronization such as clock frequency and timing synchronization.

CPRI transports in-phase and quadrature data for a particular antenna and a particular carrier. This is called an Antenna-Carrier, AxC, and is the IQ data related to one carrier of one independent antenna element. An AxC group is an aggregation of multiple AxC streams with the same sample rate, the same sample width, and the same destination. An AxC container consists of a number of AxCs and is a part of a basic CPRI frame.

The CPRI is essentially a synchronous transmission link based on a frame structure with a length of a basic frame thereof according to the width of a WCDMA chip, i.e., 1/3.84 MHz=~260.42 ns. A basic frame BF consists of 16 words typically indicated with numbers W=0, . . . , 15. The word with the number W=0 is a control word for transmission control and management of plane data, synchronization data and other information. The remaining words W= 1, . . . , 15 are used for transmitting IQ data. The CPRI has defined different line rates. The frame structure of the CPRI for every rate is the same, but the word length of the corresponding basic frame is different. For the sake of a better understanding only, the following table lists exemplary CPRI line bit rates and word lengths as defined in the specification V7.0 of Oct. 9, 2015:

| CPRI line bit rate [Mbits/s] | Line coding | Length of word [bit] | Length of word [byte] | Length of control word [bit] |
|---|---|---|---|---|
| 614.4 | 8B/10B | T = 8 | Y = 1 | $T_{CW} = T$ |
| 1228.2 | 8B/10B | T = 16 | Y = 2 | |
| 2457.6 | 8B/10B | T = 32 | Y = 4 | |
| 3072.0 | 8B/10B | T = 40 | Y = 5 | |
| 4915.2 | 8B/10B | T = 64 | Y = 8 | |
| 6144.0 | 8B/10B | T = 80 | Y = 10 | |
| 8110.08 | 64B/66B | T = 128 | Y = 16 | |
| 9830.4 | 8B/10B | | | |
| 10137.6 | 64B/66B | T = 160 | Y = 20 | $T_{CW} = 128$ |
| 12165.12 | 64B/66B | T = 192 | Y = 24 | |
| 24330.24 | 64B/66B | T = 384 | Y = 48 | |

Based on a basic frame BF, every 256 basic frames further constitute a hyperframe HF, and 150 hyperframes correspond to a WCDMA physical frame having a length of 10 ms. In the CPRI specification, for convenient denotation, Z (Z=0, . . . , 149) is used to represent the hyperframe number of a corresponding hyperframe in a UMTS physical frame having a length of 10 ms, X (X=0, . . . , 255) is used to represent the frame number of a corresponding basic frame BF in a hyperframe HF, W (W=0, . . . , 15) is used to represent the number of a corresponding word in a basic frame BF, Y (Y=24) is used to represent the number of a corresponding byte of one word consisting of a basic frame BF, and T (T=0, . . . , 192) is used to represent the number of a corresponding bit of one word consisting of a basic frame BF.

Figure 3:
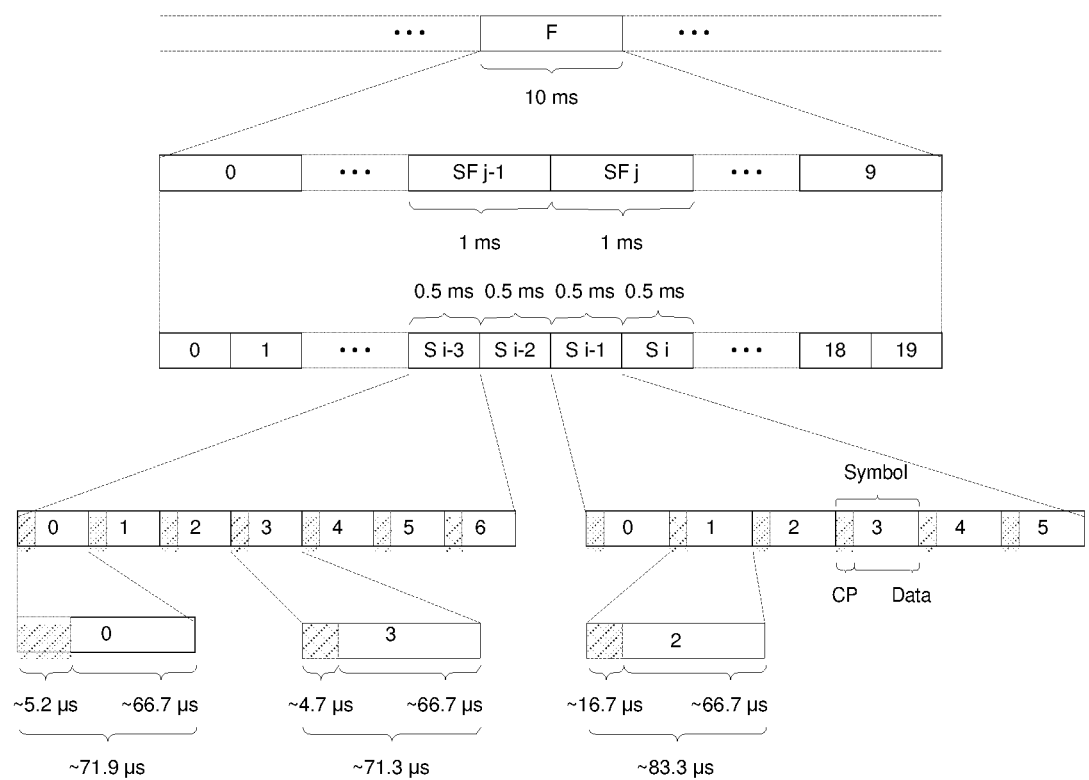
FIG. 3 schematically illustrates the frame structure of an LTE, Long Term Evolution, network data frame.

Referring now to FIG. 3, the organization structure of an LTE, Long Term Evolution, /LTE-A, Long Term Evolution-Advanced, data frame is schematically illustrated. The exemplarily illustrated frame structure should be understood to be representative of OFDMA, Orthogonal Frequency-Division Multiple Access, based networks. Each frame F is 10 ms long and is divided into ten sub-frames SF. Each sub-frame SF is, in turn, divided into two "slots 5". Hence, there are 20 slots S 0 to S 19 in each frame. Each slot S, in turn, is used to send a plurality of symbols.

The number of OFDMA symbols depends on the manner in which the symbols are augmented to protect against inter-symbol interference. In the time domain, a form of guard band is also utilized to reduce inter-symbol interference. A cyclic prefix (CP) is added to the beginning of each time period. The cyclic prefix is just a repeat of a number of samples from the end of the samples representing the symbol. There are different types of the cyclic prefix used to protect against inter-symbol interference. The types of cyclic prefix differ in size.

So-called normal cyclic prefix, CP, may be added to the symbols of a slot as illustratively shown with respect to the slot "S i–3". Alternatively, so-called extended cyclic prefix, CP, may be added to the symbols of a slot as illustratively shown with respect to slot "S i–1". The size of an extended cyclic prefix is larger than the size of a normal prefix. The size of the useful data comprises in the symbols is the same independent of the used cyclic prefix type. Accordingly, the number of symbols included in a slot depends on the used type of cyclic prefix.

As illustratively shown with respect to the slot S i–3, a slot comprises 7 symbols in case of normal cyclic prefix, nCP. As further illustratively shown with respect to the slot S i–1, a slot comprises 6 symbols in case of extended cyclic prefix, eCP.

Furthermore, the size of the normal cyclic prefix is different for the first symbol of a slot. In the example shown in FIG. 3, the normal cyclic prefix of the first symbol is approx. 5.2 µs long, whereas the normal cyclic prefix of the remaining symbols is approx. 4.7 µs long. The symbol part comprising useful data is approx. 66.7 µs long. The size of the extended cyclic prefix is the same for the symbols of a slot. In the example shown in FIG. 3, the extended cyclic prefix of the symbols is approx. 16.7 µs long. Likewise, the symbol part comprising useful data is approx. 66.7 µs long.

Further parameters and properties of different exemplary LTE, LTE-A channel modes can be obtained from following table included for the sake of better understanding only.

| | Exemplary LTE channel modes | | | |
|---|---|---|---|---|
| Channel bandwidth [MHz] | 5 | 10 | 15 | 20 |
| Number of Sub-Carriers | 300 | 600 | 900 | 1200 |
| Number of Resource Blocks | 25 | 50 | 75 | 100 |
| Sampling Rate [MHz] | 7.68 | 15.36 | 23.04 | 30.72 |
| FFT Size (payload/useful data) | 512 | 1024 | 1536 | 2048 |
| Data Sub-Carriers (+DC Sub-Carrier) | 300 | 600 | 900 | 1200 |
| Guard Sub-Carriers | 212 | 424 | 636 | 848 |
| Number of normal Cyclic Prefix, nCP, samples (length) | 40/36 | 80/72 | 120/108 | 160/144 |
| Number of extended Cyclic Prefix, eCP, samples (length) | 128 | 256 | 384 | 512 |
| Samples per Slot | 3840 | 7680 | 11520 | 15360 |
| Total samples per 10 ms Frame | 76800 | 153600 | 230400 | 307200 |

Consider the LTE/LTE-A 20 MHz case with a sampling rate of 30.72 Msps (mega samples per second) corresponding to a sampling rate of 30.72 Mhz. Assuming I=16 bits (in-phase data size) and Q=16 bits (quadrature data size), there are a total of 32 bits in one AxC, which after 8b/10b encoding increases to 40 bits. This IQ data at a sample rate of 30.72 Msps will result in a data rate of 1.2288 Gbps (giga bits per second, Gbit/s), which happens to be CPRI rate #2. So, one 20 MHz LTE carrier for one antenna with 16 bits of IQ data requires a CPRI rate #2 link.

It should be noted that LTE-A, Long Term Evolution-Advanced, is an extension of LTE which provides a maximum bandwidth of 100 MHz. LTE-A uses a technique known as carrier aggregation for obtaining the 100 MHz bandwidth. It means that a number of different component carriers are combined at the device so as to increase the data rate and bandwidth.

Figure 4A:
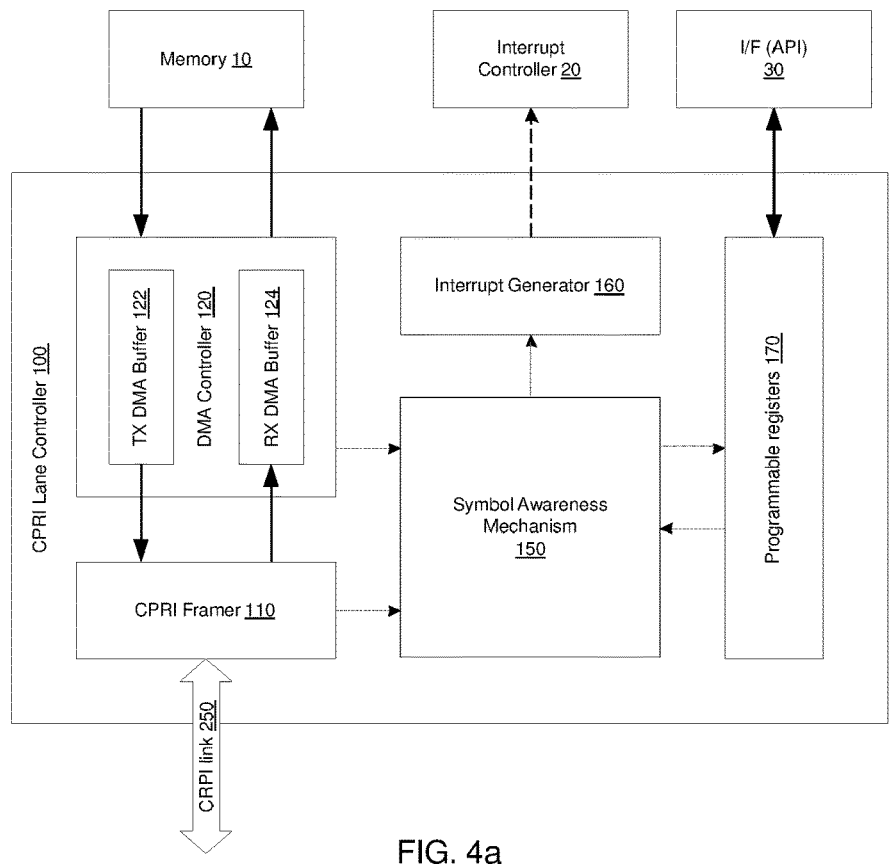
FIGS. 4a and 4b schematically illustrate block diagrams of a CPRI lane controller according to examples of the present application.

Referring now to FIG. 4a, a block diagram of a CPRI lane controller according to an example of the present application is schematically illustrated.

The exemplified CPRI lane controller 100 may be part of a radio equipment controller, REC, 210. Furthermore, the CPRI lane controller 100 may be part of a processor used in a data processing system. The processor may be e.g. a digital signal processor, DSP, a general purpose processor, GPP, a central processing unit, CPU, or any specific processing module such as a field programmable gate array, FPGA, or an application specific integrated circuit, ASIC.

The exemplified CPRI lane controller 100 comprises a CPRI framer 110 and a direct memory access, DMA, controller 120. The DMA controller 120 is provided to be coupled to a system memory 10 of the data processing system. A system data interconnect (not shown) interfaces between the DMA controller 120 and the system memory 120. The system data interconnect may comprise a bus or switching fabric for transferring data between the DMA controller 120 and the system memory 10.

The DMA controller is configured to perform read and write transactions to communicate data between TX and RX buffers 122, 124 and the system memory. The TX buffer 122 buffers data transferred bunch-wise with each DMA transaction from the system memory 10. The amount of data transferred from the system memory 10 to the TX buffer 122 is configurable. The RX buffer 124 buffers data received from the CPRI framer 120 to be transferred bunch-wise with each DMA transaction to the system memory 10. The amount of data transferred from the system memory 10 to the RX buffer 122 is configurable. In the following, the amount of data transferred with each DMA transaction will be also referred to as DMA transaction size or transaction size.

The CPRI framer 120 is provided and configured to construct CPRI frame structures and manage the transmission of CPRI frames over one or more CPRI links 250. The CPRI framer 120 is further configured to extract payload data and Control & Management (C&M) data from the received CPRI frames. Receive and transmit IQ data samples are transferred in and out of the TX DMA buffer 122 and the RX DMA buffer 214.

For instance, in order to receive OFDMA signals such as LTE signals over the air interface 290 from a user equipment, the RE 220 may be provided with a down-converter and an analog to digital converter (ADC), which samples and digitizes the baseband signals. Digital IQ data is generated by the ADC and may be transmitted over the CPRI link 250 to the REC 210. The DMA controller 120 is provided in the REC 210 for transferring IQ data arriving over the CPRI link 250 into preconfigured locations in the system memory 10. The REC 210 may further comprise a FFT module, fast Fourier transform module, which converts the received digital IQ data (the resulting baseband signal as an information symbol of the time domain), to a subcarrier signal as an information symbol of the frequency domain, according to the FFT size corresponding to the received channel bandwidth. A cyclic prefix removal and unwrap module 204 may also be included in the REC 210 for performing further processing on the transformed data samples. Other functional modules (not shown) may be included in the REC 210 for performing additional processing of the LTE signals in accordance with conventional techniques.

For instance, for transmitting OFDMA signals such as LTE signals over the air interface from the RE 220 to a user equipment, the REC 210 may be provided with an iFFT module, inverse fast Fourier transform module, which converts an incoming subcarrier signal of information symbols in the frequency domain to digital IQ data samples as a time domain information symbol according to the iFFT size corresponding to the transmission channel bandwidth. A cyclic prefix insertion and wrap process may be applied to the incoming samples prior to their transform in the iFFT module. The DMA controller 120 is used to transfer transformed IQ data samples from the system memory 10 to the CPRI link 250.

The CPRI framer 110 may also be provided for positioning IQ data samples, read from the system memory 10, into a basic CPRI frame structure in accordance with CPRI specifications for transmission to the RE 220 over the CPRI link 250. The framer 110 may also be used to extract IQ data samples from the received frames (from the RE 220), which are subsequently written into system memory 10 by way of the DMA operation under control of the DMA controller 120. Other functional modules (not shown) may be included in the REC 210 for performing additional processing of the LTE signals (such as modulation, channel coding and interleaving) in accordance with conventional techniques. Included in the RE 220 there may be a digital to analog converter for converting the digital IQ samples received over the CPRI link 250 to an analog signal.

As also briefly outlined above, those skilled in the art are aware that the processing of the LTE TX and RX signals, e.g. at the REC 210, is symbol-based. In RX operation or uplink operation, the reception of complete IQ data representative of an OFDMA symbol should be indicated to the processing system processing the incoming IQ data stream. In TX operation or downlink operation, the transmission of complete IQ data representative of an OFDMA symbol should be indicated to the processing system informing the processing system to prepare a next symbol.

The symbol awareness is provided by the symbol awareness mechanism 150. Based on a symbol awareness mechanism 150, an interrupt is generated once at least the IQ data of a symbol has been written to the system memory 10 or at least the IQ data of a symbol has been read from the system memory 10. In particular, the interrupt indicates the completion of the DMA-based data transaction between the system memory 10 and the respective TX or RX buffer 122, 124. The transferred data comprises at least the complete IQ data of one symbol. The data is transferred in one or more DMA transactions under control of the DMA controller 120. More particularly, the transaction size of the DMA transactions used to transfer the IQ data between the system memory and the respective TX or RX buffer 122, 124 is kept constant and may be unrelated to the size properties of the CPRI link. The size of the DMA transactions is adjustable. The adjustability of the DMA transaction size allows for optimizing the overall throughput on the data bus(ses) of the system implementing the CPRI lane controller 100. The transaction size of the DMA transactions to the system memory 10 and the transaction size of the DMA transactions from the system memory 10 may be different.

The symbol awareness mechanism 150 is further coupled to or comprises one or more configuration registers 170, which are configurable through a register interface 30 e.g. via an application program interface (API). The symbol awareness mechanism 150 e.g. is coupled to or comprises an interrupt generator 160, which on signalization from the symbol awareness mechanism 150 generates a symbol awareness interrupt to communicate the symbol awareness event in the processing system implementing the CPRI lane controller 100. The symbol awareness interrupt is for instance signalized to an interrupt controller 20 of the processing system.

It should be noted that the above example the symbol awareness mechanism 150 triggering the interrupt generator to issue an interrupt is only one non-limiting example. The symbol awareness mechanism 150 may be coupled to an event generator, which, on signalization of the signal awareness event from the symbol awareness mechanism 150, triggers an event in the processing system indicating that data has been transferred, which comprises at least the complete IQ data of a symbol. Those skilled in the art are aware that further signaling mechanism may be used to communicate the symbol awareness event generated by the symbol awareness mechanism 150 in the processing system and to components thereof.

Figure 4B:
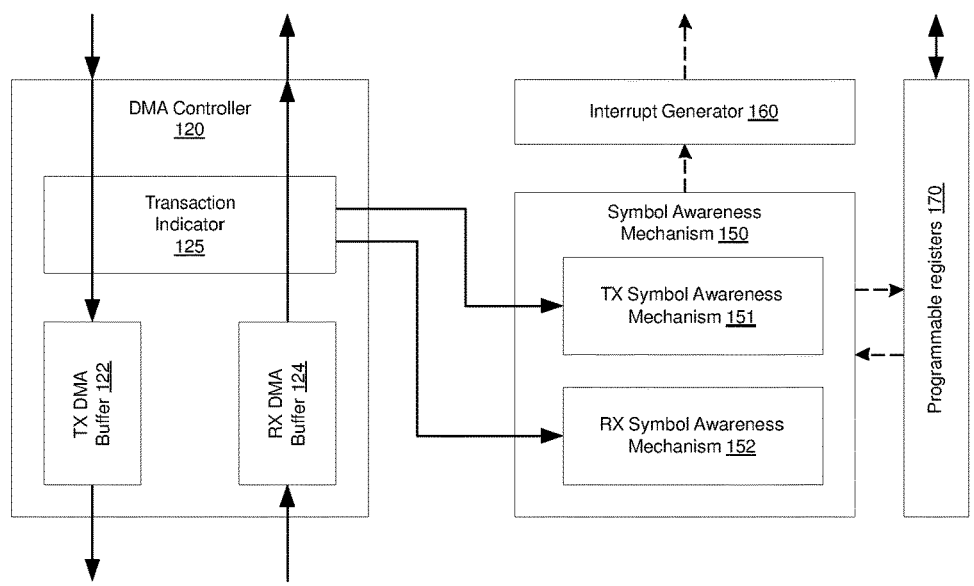

Referring now to FIG. 4b, a block diagram of a CPRI lane controller according to another example of the present application is schematically illustrated. The exemplified CPRI lane controller exemplified herein may be considered as an example implementation of the exemplary CPRI lane controller describe above with reference to FIG. 4a. The following description should be considered to supplement to the above description.

The CPRI lane controller exemplified herein comprises a symbol awareness mechanism 150 with two separate mechanisms, one for the receiving, RX, operation or uplink operation and one for transmitting, TX, operation or downlink operation.

In RX operation or uplink operation, the DMA controller 120 and a transaction indicator 125 thereof is arranged to signalize to the symbol awareness mechanism 150 every completed DMA-based data transaction to the system memory; in particular from the RX DMA buffer 124 to the system memory. The signalized DMA-based data transaction to the system memory is supplied to the RX symbol awareness mechanism 151 being part of the symbol awareness mechanism 150.

In TX operation or downlink operation, the DMA controller 120 and a transaction indicator 125 thereof is arranged to signalize to the symbol awareness mechanism 150 every completed DMA-based data transaction from the system memory; in particular from the system memory to the TX DMA buffer 122. The signalized DMA-based data transaction from the system memory is supplied to the TX symbol awareness mechanism 152 being part of the symbol awareness mechanism 150.

Figure 5:
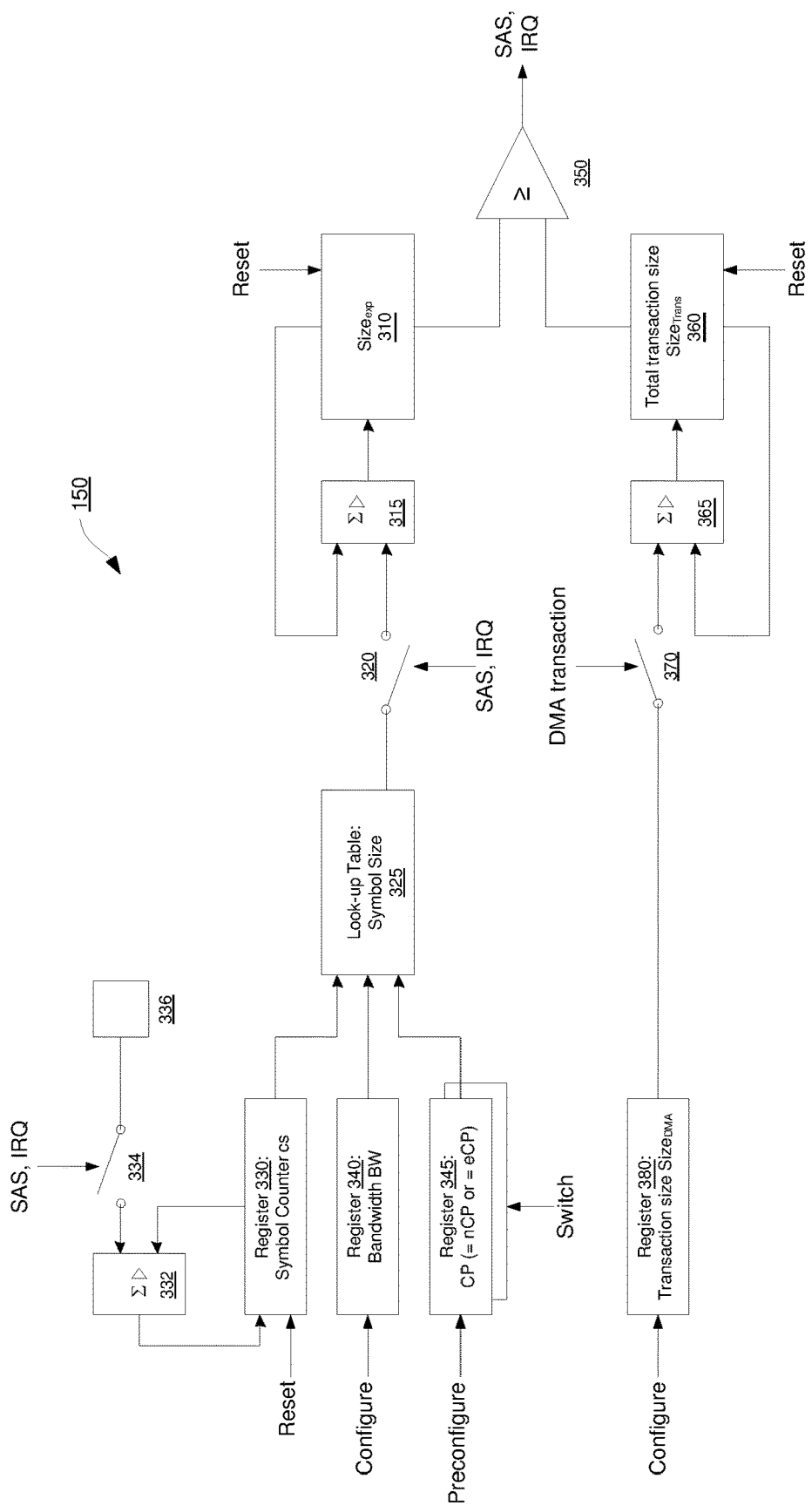
FIG. 5 schematically illustrates a block diagram of a symbol awareness mechanism according to an example of the present application.

The symbol awareness mechanism 150 and the operation thereof will be further described with reference to FIG. 5, which schematically illustrates a block diagram of a symbol awareness mechanism according to an example of the present application. In particular, the symbol awareness mechanism 150 described below relates to one of the RX symbol awareness mechanism 151 or the TX symbol awareness mechanism 152. Those skilled in the art will understand that the RX symbol awareness mechanism 151 and the TX symbol awareness mechanism 152 are implementable and operable in analogous way.

The symbol awareness mechanism may be considered to comprise two parts, a first part, which relates to a current aggregated expected symbols' size, $Size_{exp}$ and a second part, which relates to a current aggregated transactions' size, $Size_{trans}$.

A first part is configured to determine a current aggregated expected symbols' size, $Size_{exp}$. The current aggregated expected symbols' size, $Size_{exp}$, represents the amount of data, which is expected to be transferred on a CPRI link 250 in a CPRI reception or transmission operation for a sequence of OFDMA symbols with known properties. The known properties comprise the symbol bandwidth and the size of the cyclic prefix used for protecting the respective OFDMA symbols. The size of the cyclic prefix can be determined from the type of the cyclic prefix and information about the location of the OFDMA symbol in the slot/sub-frame.

A second part is configured to determine the current aggregated transactions' size, $Size_{trans}$. The current aggregated transactions' size, $Size_{trans}$, represents the amount of data, which is transferred in a sequence of DMA transactions with known properties by the DMA controller 120 between the CPRI lane controller 100 and the system memory 10. The known properties comprise the transaction size.

The current aggregated transactions' size, $Size_{trans}$, and the current aggregated expected symbols' size, $Size_{exp}$, are maintained in a respective transaction counter 310 and a respective symbol counter 360. The transaction counter 310 maintaining the current aggregated transactions' size, $Size_{trans}$, and the symbol counter 360 maintaining the current aggregated expected symbols' size, $Size_{exp}$, may be registers. The counter values are supplied to a comparator 350. The transfer of at least IQ data of a symbol is indicated by the comparator 350 once the current aggregated transactions' size $Size_{trans}$ is equal to or exceeds the current aggregated expected symbols' size, $Size_{exp}$. The comparator 350 issues a symbol awareness signal, SAS, in response to the current aggregated transactions' size, $Size_{trans}$, being equal to or greater than the current aggregated expected symbols' size, $Size_{exp}$. In an example of the present application, the transfer of at least IQ data of a symbol is indicated by the comparator 350 once the current aggregated transactions' size, $Size_{trans}$, exceeds the current aggregated expected symbols' size, $Size_{exp}$. The comparator 350 issues a symbol awareness signal, SAS, in response to the current aggregated transactions' size, $Size_{trans}$, is greater than the current aggregated expected symbols' size, $Size_{exp}$. The symbol awareness signal, SAS, is indicative of a symbol awareness event detected by the symbol awareness mechanism.

The symbol awareness signal, SAS, is supplied to the interrupt generator 160 for instance, which issues a symbol awareness interrupt, IRQ, in response thereto.

The current aggregated expected symbols' size, $Size_{exp}$, is newly determined in response to the comparator 350 indicating the transfer of at least IQ data of a symbol. The current aggregated expected symbols' size, $Size_{exp}$, is newly determined to further consider the amount of data (the data size) of the next OFDMA symbol in sequence. The current aggregated expected symbols' size, $Size_{exp}$, may be understood as a dynamic threshold. The dynamic threshold is adopted in response to the symbol awareness signal, SAS. The adopted dynamic threshold considers the size of the next OFDMA symbol in the sequence of OFDMA symbols. An symbol awareness event occur as soon as the current aggregated transactions' size, $Size_{trans}$, is equal to or exceeds the dynamic threshold, which is in turn adopted in response to the occurred symbol awareness event.

The current aggregated expected symbols' size, $Size_{exp}$, is determined by symbol-wise accumulating the sizes of the OFDMA symbols of a sequence of OFDMA symbols. The symbol-wise accumulation is schematically illustrated in FIG. 5 with respect to an accumulator 315 and a switch 320 operated into closed operation in response to a signal awareness signal. The current aggregated transactions' size, $Size_{trans}$, is determined by symbol-wise accumulating the sizes of the IQ data relating to the sequence of OFDMA symbols. The accumulated sizes of the IQ data of the sequence of OFDMA symbols comprises the OFDMA symbols currently transferred or received by the CPRI lane controller 100.

The current aggregated expected symbols' size, $Size_{exp}$, is determined by transaction-wise accumulating the DMA transactions performed by the DMA controller 120 in response to the sequence of OFDMA symbols. The DMA transactions may comprise read DMA transactions in case the sequence of OFDMA symbols is transferred by the CPRI lane controller 100 or write DMA transactions in case the sequence of OFDMA symbols is received by the CPRI lane controller 100. The transaction-wise accumulation is schematically illustrated in FIG. 5 with respect to an accumulator 365 and a switch 370 operated into closed operation in response to a DMA transaction signal indicating the completion of a DMA transaction issued by the DMA controller 120.

In an example, the current aggregated expected symbols' size, $Size_{exp}$, and the current aggregated transactions' size, $Size_{trans}$, are reset on each radio frame boundary.

As aforementioned, the size of an OFDMA symbol is a function of the bandwidth and the size of the cyclic prefix. The size of the cyclic prefix can in turn be determined from the cyclic prefix type and the location of the OFDMA symbol in the slot in order to consider the different sizes of cyclic prefixes of normal cyclic prefix type.

The symbol awareness mechanism 150 comprises one or more registers, which keep information relating to the parameters defining the sizes of the symbols of the sequence of symbols to allow for determining symbol-wise the current aggregated expected symbols' size, $Size_{exp}$. The one or more registers comprise an information about the bandwidth.

In case of LTE/LTE-A, the bandwidths are e.g. 1.4 MHz, 3 MHz, 5 MHz, 10 MHz, 15 MHz or 20 MHz. It should be noted that CPRI supports different mapping modes. In a mapping mode, which may be designated as basic mapping mode, all of the AxC interfaces use the same sample rate and sample width, and the uplink and downlink sample rates are identical. The bandwidth information may be obtained from the CPRI lane controller 100. In further mapping modes, which may be designated as advanced mapping modes, different data channels can use different sample rates, and the sample rates need not be integer multiples of 3.84 MHz. However, all data channels use the same sample width. Accordingly, the bandwidth of the AxCs may be configured in registers 340 of the symbol awareness mechanism 150 based on a mapping table for the different data channels.

The bandwidth information is configured only once at an initial configuration phase of the CPRI lane controller 100 for establishing a CPRI link 250.

The cyclic prefix type is kept for instance in a register 345 and is configured OFDMA symbols of for each sub-frame. The cyclic prefix type is the same for each OFDMA symbol of a sub-frame but may change every sub-frame. The cyclic prefix type is preconfigured for the symbols of the first sub-frame to be transferred over the CPRI link 250. The cyclic prefix type of a sub-frame next in sequence should be configured in advance, in particular during the transfer of the symbols of the current sub-frame. The register 345 keeping the cyclic prefix type may be configured as a shadow register to allow for pre-configuration.

In TX operation or downlink operation, the information about the cyclic prefix type is available at the processing system comprising the CPRI lane controller 100. The OFDMA symbols to be transmitted in the TX operation or downlink operation are read from the system memory 10 of the processing system. In RX operation or uplink operation, the information about the cyclic prefix type is available through a side channel to the CPRI lane controller 100 from the sender such as the RE 220. Additionally or alternatively, the information about the cyclic prefix type is also reconfigurable at the CPRI lane controller 100.

Further, the symbol awareness mechanism 150 comprises a resister 330 keeping an index value relating to the OFDMA symbol expected to be currently transferred. The symbol index value kept in the resister 330 is increased in response to the symbol awareness signal, SAS. The index value counter is schematically illustrated in FIG. 5 based on an accumulator 332 and a switch 334 operated in closed position by the symbol awareness signal, SAS. The symbol index value may be reset every slot or sub-frame. The reset may be determined based on the cyclic prefix type valid for the current sub-frame. A reset is performed for instance if the symbol index value exceeds 5 (every slot) or 11 (every sub-frame) in case of the extended cyclic prefix type or if the symbol index value exceeds 6 (every slot) or 13 (every sub-frame) in case of the normal cyclic prefix type (assuming that the first symbol represented by symbol index value "0").

A table 325 is provided, which accepts the parameters defining the size of the symbol expected to be currently transferred, i.e. the bandwidth information, the cyclic prefix type information and the symbol index value. Based on the supplied parameters, the table 325, which may be a look-up table 325, outputs the size of the symbol expected to be currently transferred. The size of the symbol expected to be currently transferred is provided to be accumulated to the current aggregated expected symbols' size, $Size_{exp}$.

In an example of the present application, the table 325 is a table implemented in hardware.

The symbol awareness mechanism 150 further comprises a register 380, which keeps information about the DMA transaction size applied by the DMA controller 120 of the CPRI lane controller 100. The DMA transaction size may comprise for instance 64, 128, 256, 512, 1024 and 2048 bytes.

Figure 6:
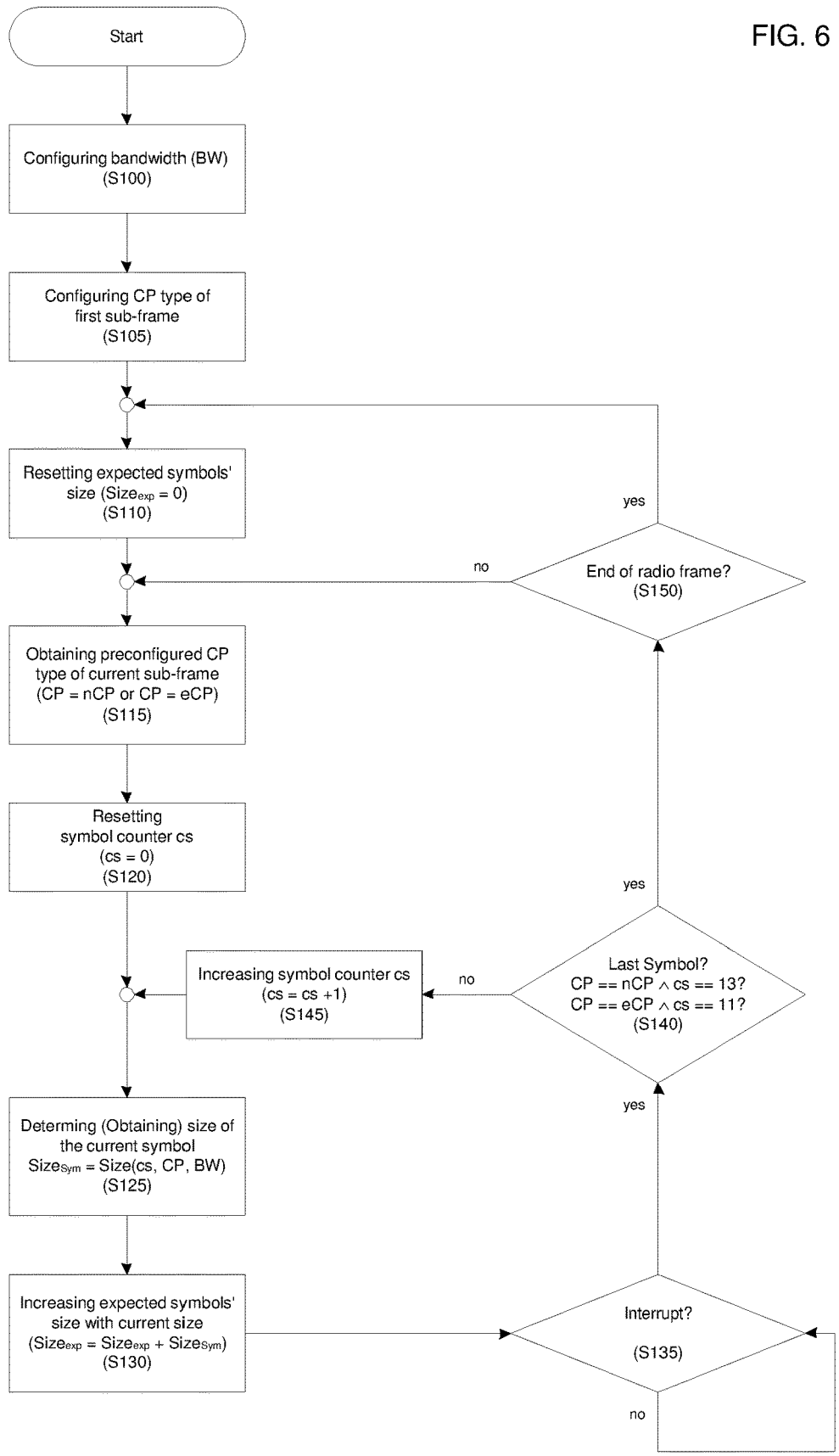
FIG. 6 schematically illustrates a flow diagram relating to the accumulation of the current aggregated expected symbols' size, $Size_{exp}$, according to an example of the present invention.

The functionality of the symbol awareness mechanism 150 will be further described with reference to FIG. 6 schematically illustrating a flow diagram relating to the accumulation of the current aggregated expected symbols' size, $Size_{exp}$. In particular, the flow diagram shown in FIG. 6 exemplarily illustrates a flow diagram relating to the monitoring of the current aggregated expected symbols' size, $Size_{exp}$.

Initially, the bandwidth, BW, is configured in an operation S100. Further, the cyclic prefix type valid for the OFDMA symbols of the first sub-frame is preconfigured in an operation S105.

In an operation S110, the current aggregated expected symbols' size, $Size_{exp}$, is reset to initial value, e.g. $Size_{exp}:=0$.

In an operation S115, the cyclic prefix type, CP, of the current sub-frame is obtained from the shadow register. The cyclic prefix type may be normal cyclic prefix type, nCP, or extended cyclic prefix type, eCP.

In an operation S120, the symbol counter holding the symbol index value, cs, is reset to initial index value, e.g. cs:=0.

In an operation S125, the size of the current OFDMA symbol expected to be currently transferred is obtained from the hardware table 150 based on the configured bandwidth information, the obtained cyclic prefix type information and the current symbol index value, e.g. $Size_{Sym}$[bytes]:=Size (cs, CP, BW).

In an operation S130, the current aggregated expected symbols' size, $Size_{exp}$, is accumulated. The current aggregated expected symbols' size, $Size_{exp}$, comprising the sizes of the previously transferred OFDMA symbols is increased by the size of the OFDMA symbol, $Size_{Sym}$, expected to be currently transferred, e.g. $Size_{exp}$:=$Size_{exp}$+$Size_{Sym}$.

In an operation S135, the symbol awareness mechanism 150 awaits a signal awareness signal, SAS, in response to which a signal awareness interrupt, IRQ, is generated. On detection of a signal awareness signal, SAS, it is verified in an operation S140, whether or not the current OFDMA symbol is the last one in the current sub-slot. In case of normal cyclic prefix type, nCP, it is verified whether or not the symbol index value cs is equal to 13 (cs==13, a LTE sub-frame comprises 14 symbols with normal cyclic prefix) or it is verified whether or not the symbol index value cs is equal to 11 (cs==11, a LTE sub-frame comprises 12 symbols with extended cyclic prefix).

If the current symbol is not the last one of the current sub-frame, the operational flow continues with an operation S140, where the symbol counter increases the symbol index value, e.g. cs:=cs+1, and further commences with the operation S125 to obtain the size of the next current OFDMA symbol expected to be currently transferred from the hardware table 150 based on the configured bandwidth information, the obtained cyclic prefix type information and the current symbol index value, e.g. $Size_{Sym}$:=Size(cs, CP, BW).

If the current symbol is the last one of the current sub-frame, the operational flow continues with an operation S150, in which it is verified whether or not the current symbol is the last OFDMA symbol of the current CPRI/LTE (10 ms) frame. In the present example, the verification for the last OFDMA symbol is performed to allow for accumulation of the sizes of the OFDMA symbols over only one CPRI/LTE frame. The limiting of the accumulation over only one CPRI/LTE frame takes into account that a CPRI frame and a LTE frame are both 10 ms long.

If the current symbol is not the last one of the current frame, the operational flow continues with an operation S115, where the cyclic prefix type, CP, of the next current sub-frame is obtained from the shadow register.

If the current symbol is the last one of the current frame, the operational flow continues with an operation S110, where the current aggregated expected symbols' size, $Size_{exp}$, is reset to initial value, e.g. $Size_{exp}$:=0.

In an operation S125, the size of the current OFDMA symbol expected to be currently transferred is obtained from the hardware table 150 based on the configured bandwidth information, the obtained cyclic prefix type information and the current symbol index value, e.g. $Size_{Sym}$:=Size(cs, CP, BW).

The functionality and operation of the hardware table 150 is schematically illustrated in FIG. 6 (cont.). In particular, the flow diagram shown in FIG. 6 (cont.) exemplarily illustrates a flow diagram relating to the determining of the size of a current symbol, $Size_{Sym}$. The flow diagram shown in FIG. 6 (cont.) is substantially self-explanatory and is summarized briefly only in the following.

In an operation S160, it is first verified whether or not the cyclic prefix type is the extended cyclic prefix type or the normal cyclic prefix type.

In case the cyclic prefix type is the extended cyclic prefix type (CP==eCP), the size of the current OFDMA symbol correspond to the size of an OFDMA symbol with extended cyclic prefix of the configured bandwidth, e.g. $Size_{Sym}$:=$Size_{eCP}$(BW), in an operation S161.

In case the cyclic prefix type is the normal cyclic prefix type (CP==nCP), it is further verified in an operation S162, whether the current OFDMA symbol is the first OFDMA symbol of the current slot. The current OFDMA symbol is the first OFDMA symbol of the current slot in case the symbol index value is equal to 0 or is equal to 7 (cs==0 OR cs==7) provided that the OFDMA symbols of a sub-frame (comprising two slots) are counted.

In case the current OFDMA symbol is the first OFDMA symbol of the current slot, the size of the current OFDMA symbol correspond to the size of a first OFDMA symbol with normal cyclic prefix of the configured bandwidth, e.g. $Size_{Sym}$:=$Size_{nCP1}$(BW), in an operation S163.

In case the current OFDMA symbol is not the first OFDMA symbol of the current slot, the size of the current OFDMA symbol correspond to the size of another OFDMA symbol with normal cyclic prefix of the configured bandwidth, e.g. $Size_{Sym}$:=$Size_{nCP}$(BW), in an operation S164.

OFDMA symbol sizes for the various cases are summarized above with respect to the LTE frame structure.

Figure 7:
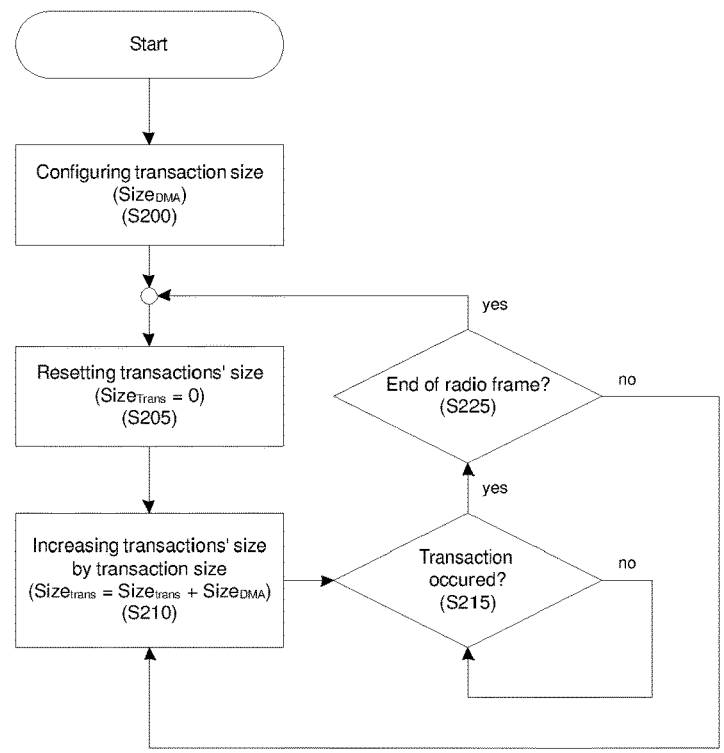
FIG. 7 schematically illustrates a flow diagram of relating to the accumulation of the current aggregated transactions' size, $Size_{trans}$, according to an example of the present invention.

The functionality of the symbol awareness mechanism 150 will be further described with reference to FIG. 7 schematically illustrating a flow diagram relating to the accumulation of the current aggregated transactions' size, $Size_{trans}$. In particular, the flow diagram shown in FIG. 7 exemplarily illustrates a flow diagram relating to the monitoring of the current aggregated transactions' size, $Size_{trans}$.

Initially, the transaction size is configured in an operation S200, $Size_{DMA}$, e.g. $Size_{DMA}$[bytes]:=64, 128, 256, 512, 1024, 2048.

In an operation S205, the current aggregated transactions' size, $Size_{trans}$, is reset to initial value, e.g. $Size_{trans}$:=0.

In an operation S210, the current aggregated transactions' size, $Size_{trans}$, is accumulated. The current aggregated transactions' size, $Size_{trans}$, comprising the sizes of the previously DMA transactions is increased by the transaction size, $Size_{DMA}$, e.g. $Size_{trans}$:=$Size_{trans}$+$Size_{DMA}$.

In an operation S215, the symbol awareness mechanism 150 awaits a DMA transaction completion signal from the DMA controller 120, which is issued once a DMA transaction is completed. On detection of the DMA transaction completion signal, it is verified in an operation S225, whether or not the end of the LTE frame has been reached. The end of the LTE frame may be determined by comparing the current aggregated transactions' size, $Size_{trans}$, with the total bit/byte count of a LTE frame, which is dependent on the bandwidth, BW as aforementioned.

If the end of the LTE frame has not been reached, the operational flow continues with the operation S210, where the current aggregated transactions' size, $Size_{trans}$, is accumulated, e.g. $Size_{trans}$:=$Size_{trans}$+$Size_{DMA}$.

If the end of the LTE frame has been reached, the operational flow continues with the operation S205, where the current aggregated transactions' size, $Size_{trans}$, is reset to initial value, e.g. $Size_{trans}$:=0.

Figure 8:
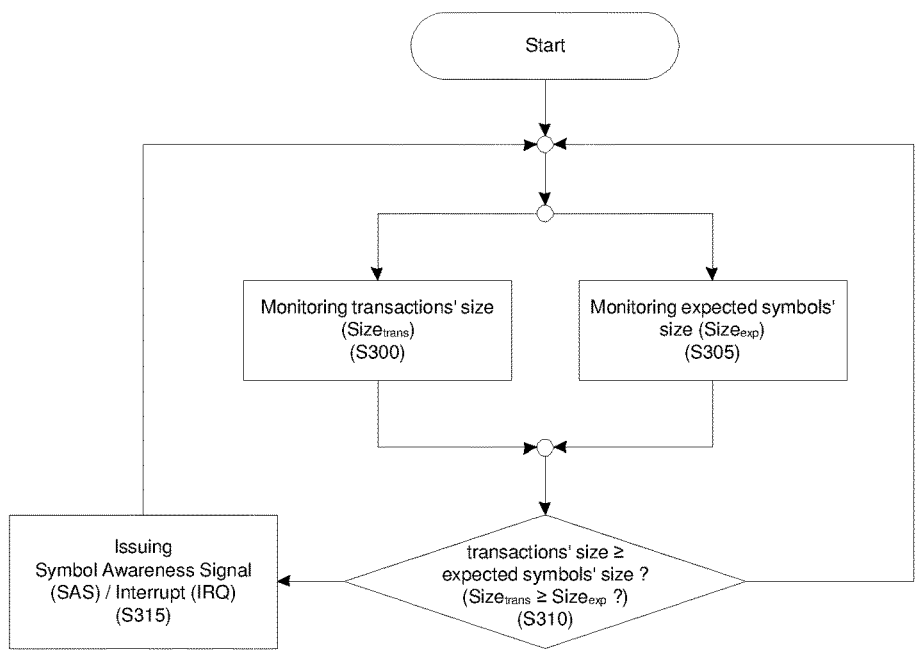
FIG. 8 schematically illustrates a flow diagram of relating to the comparison of the current aggregated expected symbols' size, $Size_{exp}$ and the current aggregated transactions' size, $Size_{trans}$, according to an example of the present invention.

The functionality of the symbol awareness mechanism 150 will be further described with reference to FIG. 8 schematically illustrating a flow diagram relating to the comparison of the current aggregated expected symbols' size, $Size_{exp}$ and the current aggregated transactions' size, $Size_{trans}$. In particular, the flow diagram shown in FIG. 8 exemplarily illustrates a flow diagram relating to the issuing of a symbol awareness indicative of one of the reception and transmission of a symbol.

In operations S300, S305 and S310, the current aggregated expected symbols' size, $Size_{exp}$ and the current aggregated transactions' size, $Size_{trans}$, are continuously monitored and compared with each other. In case the current aggregated transactions' size, $Size_{trans}$, is equal to or exceeds the current aggregated expected symbols' size, $Size_{exp}$, the symbol awareness signal, SAS, is issued by the comparator 350, in response to which the symbol awareness interrupt, IRQ, is issued to the processing system, in an operation S315. In an example of the present application, the symbol awareness signal, SAS, is issued by the comparator 350 in case the current aggregated transactions' size, $Size_{trans}$, is greater than the current aggregated expected symbols' size, $Size_{exp}$.

Figure 9:
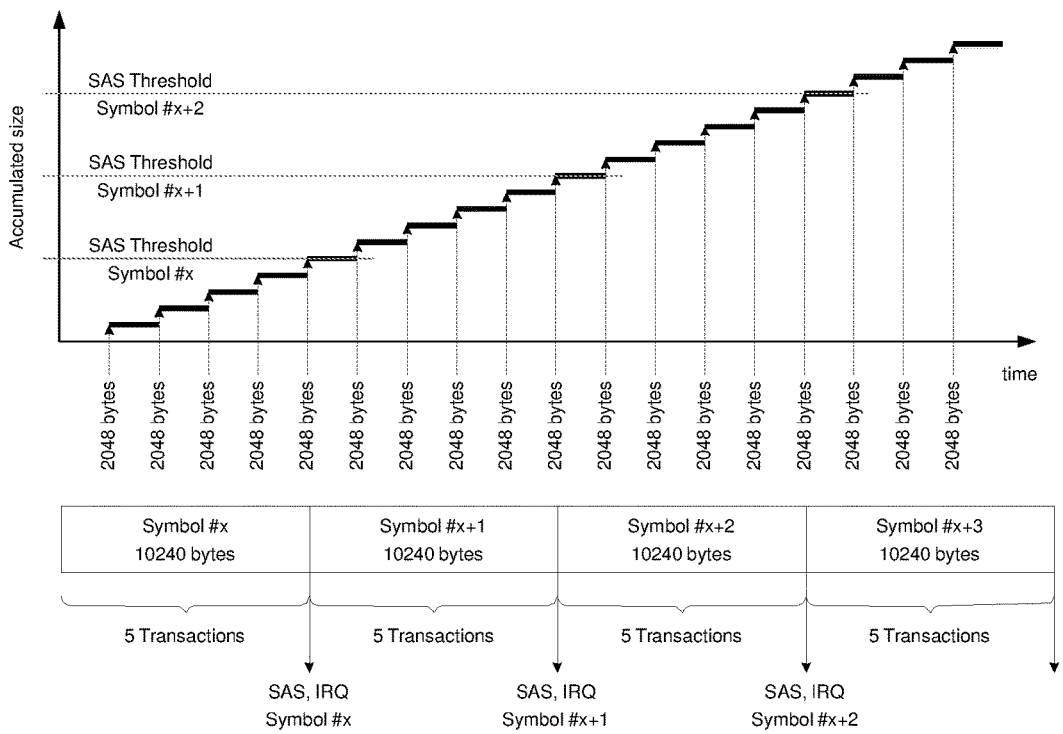
FIGS. 9 to 11 schematically illustrate graphical timing diagrams relating to the generation of symbol awareness signals according to examples of the present invention.
Figure 10:
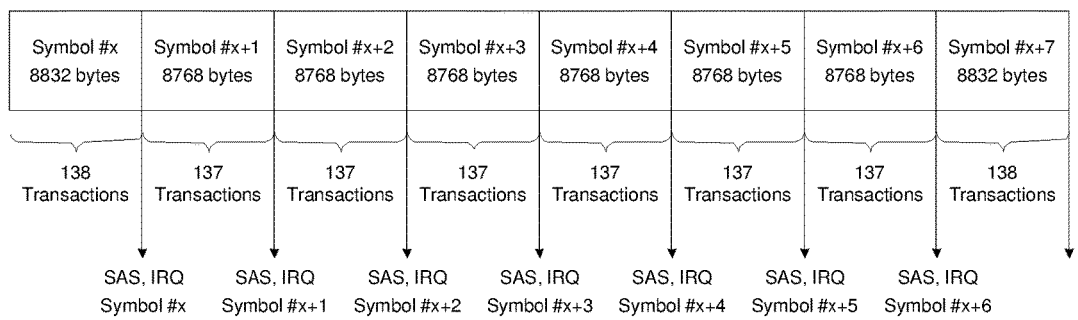
Figure 11:
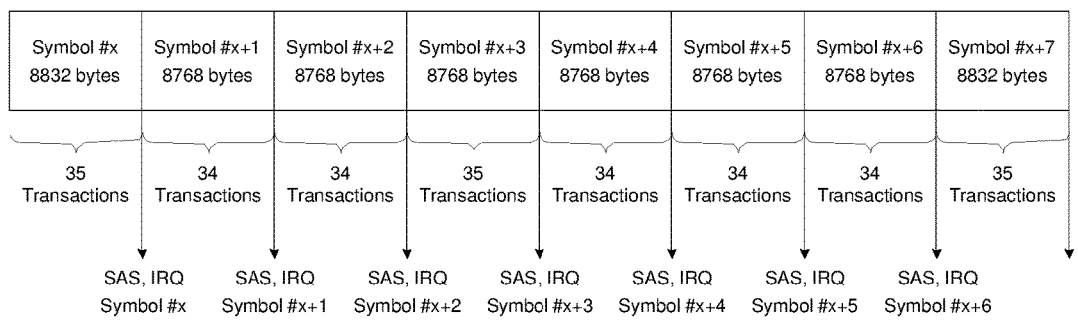

Referring now to FIGS. 9 to 11, examples are illustrated to further outline the present invention. The examples described in the following are based on the assumption that the OFDMA symbols transferred via the CPRI link 250 are LTE OFDMA symbols at a bandwidth of 20 MHz.

Referring now to FIG. 9, it should be further assumed that the OFDMA symbols are of the extended cyclic prefix type, eCP. Each slot comprises 6 OFDMA symbols. Each symbol has a size of $Size_{Sym}:=10240$ bytes. The transaction size, $Size_{DMA}$, may be any transaction size in the range of 64, 128, 256, . . . , 2048 bytes (in steps of power of two). This means that the symbol size, $Size_{Sym}$, (with eCP) is an integer multiple of the transaction size, $Size_{DMA}$. Symbol awareness signals, SAS, or interrupts, IRQ, are hence generated after every $Size_{Sym}/Size_{DMA}$ transactions.

In FIG. 9, a transaction size of 2048 bytes, $Size_{DMA}:=2048$ bytes, is assumed. Accordingly, a symbol awareness signal, SAS, or interrupt, IRQ, is generated after every 10240 bytes/2048 bytes=5 transactions. The symbol awareness signal, SAS, triggers the symbol awareness interrupt, IRQ.

The stepwise curve illustrated in the diagram of FIG. 9 represents the current aggregated transactions' size, $Size_{trans}$. The current aggregated expected symbols' size, $Size_{exp}$, is illustrated in form of lines parallel to the abscissa. From the diagram of FIG. 9, it is well understood that the current aggregated expected symbols' size, $Size_{exp}$, represents a dynamic threshold adopted for each OFDMA symbol expected to the transferred.

Referring now to FIG. 10, it should be further assumed that the OFDMA symbols are of the normal cyclic prefix type, eCP. Each slot comprises 7 OFDMA symbols. The first symbol of every slot has a size of $Size_{Sym}:=8832$ bytes and the remaining symbols have a size of $Size_{Sym}:=8768$ bytes. The symbol size $Size_{Sym}$, may be not a multiple integer of the transaction size, $Size_{DMA}$.

In FIG. 10, a transaction size of 65 bytes, $Size_{DMA}:=64$ bytes, is assumed. In this case, the size of the first symbol and the size of the remaining symbols are integer multiple of the transaction size $Size_{DMA}$. As illustrated in FIG. 10, the symbol awareness signals, SAS and interrupts, IRQ, indicating that the IQ data of a complete symbol has been read from or written to the system memory 10 are generated after 8832 bytes/64 bytes=138 transactions for the first symbol of every slot and 8768 bytes/64 bytes=137 transactions for each remaining symbol of every slot, respectively.

Referring now to FIG. 11, it should be further assumed that the OFDMA symbols are of the normal cyclic prefix type, eCP. Each slot comprises 7 OFDMA symbols. The first symbol of every slot has a size of $Size_{Sym}:=8832$ bytes and the remaining symbols have a size of $Size_{Sym}:=8768$ bytes. The symbol size $Size_{Sym}$, may be not a multiple integer of the transaction size $Size_{DMA}$.

In FIG. 11, a transaction size of 256 bytes, $Size_{DMA}:=256$ bytes, is assumed. In this case, the size of the first symbol and the size of the remaining symbols are not integer multiple of the transaction size $Size_{DMA}$. As illustrated in FIG. 11, the symbol awareness signal, SAS and interrupt, IRQ, is generated after 35 transactions for the first symbol of every slot since 8832 bytes/256 bytes=34.5.

This means that at the point in time, at which the symbol awareness signal, SAS, and interrupt, IRQ, relating to the first symbol of every slot is generated, 128 bytes of the second symbol of the slot have been already transferred by the previous last DMA transaction. Accordingly, the symbol awareness signal, SAS, and interrupt, IRQ, is generated after 35+34=69 transactions for the second symbol of every slot since (8832 bytes+8768 bytes)/256 bytes=68.75.

Further, the symbol awareness signal, SAS, and interrupt, IRQ, is generated after 35+34+34=103 transactions for the third symbol of every slot since (8832 bytes+2×8768 bytes)/256 bytes=103.

Further, the symbol awareness signal, SAS, and interrupt, IRQ, is generated after 35+34+34+35=138 transactions for the fourth symbol of every slot since (8832 bytes+3×8768 bytes)/256 bytes=137.25.

Further, the symbol awareness signal, SAS, and interrupt, IRQ, is generated after 35+34+34+35+34=172 transactions for the fifth symbol of every slot since (8832 bytes+4×8768 bytes)/256 bytes=171.5.

Further, the symbol awareness signal, SAS, and interrupt, IRQ, is generated after 35+34+34+35+34+34=206 transactions for the sixth symbol of every slot since (8832 bytes+6×8768 bytes)/256 bytes=205.75.

Further, the symbol awareness signal, SAS, and interrupt, IRQ, is generated after 35+34+34+35+34+34+34=240 transactions for the seventh symbol of every slot since (8832 bytes+6×8768 bytes)/256 bytes=240.

It should be noted that the above examples have been described with reference to OFDMA symbols and LTE/LTE-A based public land mobile network technology for the sake of explanation and better understanding only. Those skilled in the art understand from the above description that the symbol awareness mechanism is applicable with any orthogonal frequency multiplexing, OFM, based mobile communication technologies including in particular Orthogonal Frequency-Division Multiple Access, OFDMA, and Single-Carrier Frequency-Division Multiple Access, SC-FDMA, based mobile communication technologies.

According to an example of the present application, a Common Public Radio Interface, CPRI, lane controller is provided. The CPRI lane controller comprises a transaction counter, a symbol counter and a comparator. The transaction counter is provided for maintaining a current aggregated transactions' size, $Size_{trans}$, representative of an accumulated size of DMA transactions performed by a DMA controller in response to symbols transferred on a CPRI link from or to the CPRI lane controller. The symbol counter is provided for maintaining a current aggregated expected symbols' size, $Size_{exp}$, representative of an accumulated size of a sequence of transferred symbols and a currently transferred symbol. The comparator is configured to issue a symbol awareness signal, SAS, in case the current aggregated transactions' size, $Size_{trans}$, exceeds the current aggregated expected symbols' size, $Size_{exp}$. The current aggregated expected symbols' size, $Size_{exp}$, represents a dynamic threshold updated in response to every next transferred symbol indicated by the symbol awareness signal, SAS.

According to an example of the present application, the CPRI lane controller comprises the Direct Memory Access, DMA, controller arranged to perform read or write DMA transactions via a data interconnect to a memory of a processing system comprising the CPRI lane controller. The Direct Memory Access, DMA, controller is coupled to the transaction counter and configured to indicate DMA transactions thereto.

According to an example of the present application, the current aggregated transactions' size, $Size_{trans}$, and the current aggregated expected symbols' size, $Size_{exp}$, relates to one of an uplink operation, RX operation, and a downlink operation, TX operation. In an example, the CPRI lane controller comprises symbol awareness mechanism for each of the uplink operation, RX operation, and the downlink operation, TX operation.

A RX symbol awareness mechanism comprises a transaction counter, a symbol counter and a comparator. The transaction counter is provided for maintaining a current aggregated transactions' size, $Size_{trans}$, representative of an accumulated size of DMA transactions relating to the uplink operation, RX operation. The symbol counter is provided for maintaining a current aggregated expected symbols' size, $Size_{exp}$, representative of an accumulated size of a sequence of transferred symbols and a currently transferred symbol relating to the uplink operation, RX operation. The comparator is configured to issue a symbol awareness signal, SAS, in case the current aggregated transactions' size, $Size_{trans}$, exceeds the current aggregated expected symbols' size, $Size_{exp}$ relating to the uplink operation, RX operation.

A TX symbol awareness mechanism comprises a transaction counter, a symbol counter and a comparator. The transaction counter is provided for maintaining a current aggregated transactions' size, $Size_{trans}$, representative of an accumulated size of DMA transactions relating to the downlink operation, TX operation. The symbol counter is provided for maintaining a current aggregated expected symbols' size, $Size_{exp}$, representative of an accumulated size of a sequence of transferred symbols and a currently transferred symbol relating to the downlink operation, TX operation. The comparator is configured to issue a symbol awareness signal, SAS, in case the current aggregated transactions' size, $Size_{trans}$, exceeds the current aggregated expected symbols' size, $Size_{exp}$ relating to the downlink operation, TX operation.

According to an example of the present application, the comparator is further arranged to compare the size value of the transaction counter against the current aggregated expected symbols' size, $Size_{exp}$.

According to an example of the present application, the comparator is further configured to issue the symbol awareness signal, SAS, in case the current aggregated transactions' size, $Size_{trans}$, is equal to the current aggregated expected symbols' size, $Size_{exp}$.

According to an example of the present application, the symbols are part of an orthogonal frequency multiplexing, OFM, based communication instance. In particular, the symbols are OFDMA symbols. More particularly, the symbols are part of a LTE/LTE-A based communication instance.

According to an example of the present application, the transaction counter is configured to update the current aggregated transactions' size, $Size_{trans}$, by transaction-wise accumulating the sizes of DMA transactions. The symbol counter is configured to update the current aggregated expected symbols' size, $Size_{exp}$, by symbol-wise accumulating the sizes of the transferred symbols.

According to an example of the present application, the CPRI lane controller further comprises a register for storing a preconfigured transaction size, $Size_{DMA}$. The data sizes of the DMA transactions operated by the DMA controller correspond to the preconfigured transaction size, $Size_{DMA}$. The DMA transactions operated by the DMA controller have the same transaction data size. The sizes of the DMA transactions have a predefined transaction size. The transaction counter is further configured to update the current aggregated transactions' size, $Size_{trans}$, with a preconfigured transaction size, $Size_{DMA}$, in response to receiving an indication from the DMA controller indicative of a completed DMA transaction.

According to an example of the present application, the CPRI lane controller further comprises a register for storing a cyclic prefix type indicative of the type of cyclic prefix of a current sub-frame and an index counter for maintaining a symbol index value indicative of a position of the currently transferred symbol within at least one of a current slot or the current sub-frame. The symbol counter is further configured to update the current aggregated expected symbols' size, $Size_{exp}$, with a symbol size, $Size_{Sym}$, of the currently transferred symbol in response to symbol awareness signal, SAS. The symbol size, $Size_{Sym}$, of the currently transferred symbol is based on at least the cyclic prefix type and the symbol index value. In particular, the cyclic prefix type comprises a normal prefix type and an extended prefix type. Depending on the cyclic prefix type, there are 6 symbol positions in a slot or 12 symbol positions in a sub-frame in case of the extended prefix type and there are 7 symbol positions in a slot or 14 symbol positions in a sub-frame in case of the normal prefix type.

According to an example of the present application, the CPRI lane controller further comprises a register for storing a preconfigured bandwidth. The symbol size, $Size_{Sym}$, of the currently transferred symbol is further based on the preconfigured bandwidth.

According to an example of the present application, the CPRI lane controller further comprises a size table, which is configured to return the symbol size of the currently transferred symbol based on the cyclic prefix type, the symbol index value and the preconfigured bandwidth. The size table may be a hardware table, e.g. implemented in hardware, and coupled to the registers storing the cyclic prefix type and bandwidth and index value counter. The size table may be a look-up table. The symbol size is a function of a bandwidth, a cyclic prefix type and the symbol index value.

According to an example of the present application, the registers storing the cyclic prefix type and bandwidth and index value counter are comprised in a common register.

According to an example of the present application, the register for storing a cyclic prefix type is a shadow register. In particular, the shadow register is configured to accept the cyclic prefix type for the current sub-frame in advance of the transfer of the first symbol of the current sub-frame.

According to an example of the present application, the symbols transferred on the CPRI link from or to the CPRI lane controller are arranged in a frame structure comprising a sequence of radio frames each partitioned into sub-frames of equal length each further partitioned into slots of equal length. In particular, a radio frame is organized into 10 sub-frames. A sub-frame is organized into 2 slots. A slot comprises 6 or 7 symbols depending on the cyclic prefix type.

According to an example of the present application, the comparator is further arranged to issue the symbol awareness signal, SAS, in case the current aggregated transactions' size, $Size_{trans}$, is equal to the current aggregated expected symbols' size, $Size_{exp}$.

According to an example of the present application, a method for operating a Common Public Radio Interface, CPRI, lane controller is provided. A current aggregated transactions' size, $Size_{trans}$, representative of an accumulated size of DMA transactions performed by a DMA controller of the CPRI controller in response to a sequence of symbols transferred on a CPRI link from or to the CPRI lane controller is maintained. A current aggregated expected symbols' size, $Size_{exp}$, representative of an accumulated size of a sequence of transferred symbols and a currently transferred symbol is maintained. A symbol awareness signal, SAS, is issued in case the current aggregated transactions' size, $Size_{trans}$, exceeds the current aggregated expected symbols' size, $Size_{exp}$.

According to an example of the present application, the current aggregated transactions' size, $Size_{trans}$, is compared against the current aggregated expected symbols' size, $Size_{exp}$.

According to an example of the present application, the current aggregated transactions' size, $Size_{trans}$, is updated by transaction-wise accumulating the sizes of DMA transactions. The current aggregated expected symbols' size, $Size_{exp}$, is updated by symbol-wise accumulating the sizes of the transferred symbols.

According to an example of the present application, a preconfigured transaction size, $Size_{DMA}$, is provided. The data sizes of the DMA transactions performed by the DMA controller correspond to the preconfigured transaction size, $Size_{DMA}$. The current aggregated transactions' size, $Size_{trans}$, is updated with the preconfigured transaction size, $Size_{DMA}$, in response to receiving an indication from the DMA controller indicative of a completed DMA transaction.

According to an example of the present application, a cyclic prefix type indicative of the type of cyclic prefix of a current sub-frame is provided. A symbol index value indicative of a position of the currently transferred symbol within at least one of a current slot or the current sub-frame is provided. A symbol size, $Size_{Sym}$, of the currently transferred symbol is determined based on at least the cyclic prefix type and the symbol index value. The current aggregated expected symbols' size, $Size_{exp}$, is updated with the symbol size, $Size_{Sym}$, in response to symbol awareness signal, SAS.

According to an example of the present application, a preconfigured bandwidth is provided. The symbol size, $Size_{Sym}$, of the currently transferred symbol is further based on the preconfigured bandwidth.

According to an example of the present application, a size table is provided, which returns the symbol size, $Size_{Sym}$, of the currently transferred symbol based on the cyclic prefix type, the symbol index value and the preconfigured bandwidth.

According to an example of the present application, the current aggregated transactions' size, $Size_{trans}$, and the current aggregated expected symbols' size, $Size_{exp}$, are reset in response to detecting an end boundary of radio frame.

According to an example of the present application, the cyclic prefix type for the current sub-frame is received in advance of the transfer of the first symbol of the current sub-frame.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To illustrate clearly this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected", or "operably coupled", to each other to achieve the desired functionality.

In the claims, any reference signs placed between parentheses shall not be construed as limiting the claim. The word "comprising" does not exclude the presence of other elements or operations then those listed in a claim. Furthermore, the terms "a" or "an", as used herein, are defined as one or as more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an". The same holds true for the use of definite articles. Unless stated otherwise, terms such as "first" and "second" are used to distinguish arbitrarily between the elements such terms describe. Thus, these terms are not necessarily intended to indicate temporal or other prioritization of such elements. The mere fact that certain measures are recited in mutually different claims does not indicate that a combination of these measures cannot be used to advantage.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

The invention claimed is:

1. A Common Public Radio Interface, CPRI, lane controller, comprising
  a transaction counter provided for maintaining a current aggregated transactions' size, $Size_{trans}$, representative of an accumulated size of Direct Memory Access (DMA) transactions performed by a DMA controller in response to symbols transferred on a CPRI link from or to the CPRI lane controller;
  a symbol counter provided for maintaining a current aggregated expected symbols' size, $Size_{exp}$, representative of an accumulated size of a sequence of transferred symbols and a currently transferred symbol;
  a comparator configured to issue a symbol awareness signal, SAS, in case the current aggregated transactions' size, $Size_{trans}$, exceeds the current aggregated expected symbols' size, $Size_{exp}$.

2. The CPRI lane controller according to claim 1, wherein the CPRI lane controller comprises the Direct Memory Access, DMA, controller arranged to perform read or write DMA transactions via a data interconnect to a memory.

3. The CPRI lane controller according to claim 1, wherein the current aggregated transactions' size, $Size_{trans}$, and the current aggregated expected symbols' size, $Size_{exp}$, relates to one of an uplink operation, RX operation, and a downlink operation, TX operation.

4. The CPRI lane controller according to claim 1, wherein the comparator is further configured to compare the size value of the transaction counter against the current aggregated expected symbols' size, $Size_{exp}$.

5. The CPRI lane controller according to claim 1, wherein the symbols are part of a Frequency-Division Multiplexing, FDM, based communication instance.

6. The CPRI lane controller according to claim 1, wherein the transaction counter is configured to update the current aggregated transactions' size, $Size_{trans}$, by transaction-wise accumulating the sizes of DMA transactions; and
  wherein the symbol counter is configured to update the current aggregated expected symbols' size, $Size_{exp}$, by symbol-wise accumulating the sizes of the transferred symbols.

7. The CPRI lane controller according to claim 1, further comprising:
  a register for storing a preconfigured transaction size, $Size_{DMA}$, wherein the data sizes of the DMA transactions operated by the DMA controller correspond to the preconfigured transaction size, $Size_{DMA}$,
  wherein the transaction counter is further configured to update the current aggregated transactions' size, $Size_{trans}$, with a preconfigured transaction size, $Size_{DMA}$, in response to receiving an indication from the DMA controller indicative of a completed DMA transaction.

8. The CPRI lane controller according to claim 1, further comprising:
  a register for storing a cyclic prefix type indicative of the type of cyclic prefix of a current sub-frame; and
  an index counter for maintaining a symbol index value indicative of a position of the currently transferred symbol within at least one of a current slot or the current sub-frame,
  wherein the symbol counter is further configured to update the current aggregated expected symbols' size, $Size_{exp}$, with a symbol size, $Size_{sym}$, of the currently transferred symbol in response to symbol awareness signal, SAS,
  wherein the symbol size, $Size_{sym}$, of the currently transferred symbol is based on at least the cyclic prefix type and the symbol index value.

9. The CPRI lane controller according to claim 8, further comprising:
a register for storing a preconfigured bandwidth,
wherein the symbol size, $\text{Size}_{sym}$, of the currently transferred symbol is further based on the preconfigured bandwidth.

10. The CPRI lane controller according to claim 9, further comprising:
a size table configured to return the symbol size of the currently transferred symbol based on the cyclic prefix type, the symbol index value and the preconfigured bandwidth.

11. The CPRI lane controller according to claim 8, wherein the register for storing a cyclic prefix type is a shadow register.

12. The CPRI lane controller according to claim 11, wherein the shadow register is configured to accept the cyclic prefix type for the current sub-frame in advance of the transfer of the first symbol of the current sub-frame.

13. A method for operating a Common Public Radio Interface, CPRI, lane controller, comprising:
maintaining a current aggregated transactions' size, $\text{Size}_{trans}$, representative of an accumulated size of Direct Memory Access (DMA) transactions performed by a DMA controller of the CPRI controller in response to a sequence of symbols transferred on a CPRI link from or to the CPRI lane controller;
maintaining a current aggregated expected symbols' size, $\text{Size}_{exp}$, representative of an accumulated size of a sequence of transferred symbols and a currently transferred symbol;
issuing a symbol awareness signal, SAS, in case the current aggregated transactions' size, $\text{Size}_{trans}$, exceeds the current aggregated expected symbols' size, $\text{Size}_{exp}$.

14. The method according to claim 13, further comprising:
comparing the current aggregated transactions' size, $\text{Size}_{trans}$, against the current aggregated expected symbols' size, $\text{Size}_{exp}$.

15. The method according to claim 13, further comprising:
updating the current aggregated transactions' size, $\text{Size}_{trans}$, by transaction-wise accumulating the sizes of DMA transactions; and
updating the current aggregated expected symbols' size, $\text{Size}_{exp}$, by symbol-wise accumulating the sizes of the transferred symbols.

16. The method according to claim 13, further comprising:
providing a preconfigured transaction size, $\text{Size}_{DMA}$, wherein the data sizes of the DMA transactions performed by the DMA controller correspond to the preconfigured transaction size, $\text{Size}_{DMA}$; and
updating the current aggregated transactions' size, $\text{Size}_{trans}$, with the preconfigured transaction size, $\text{Size}_{DMA}$, in response to receiving an indication from the DMA controller indicative of a completed DMA transaction.

17. The method according to claim 13, further comprising:
providing a cyclic prefix type indicative of the type of cyclic prefix of a current sub-frame;
providing a symbol index value indicative of a position of the currently transferred symbol within at least one of a current slot or the current sub-frame;
determining a symbol size, $\text{Size}_{sym}$, of the currently transferred symbol based on at least the cyclic prefix type and the symbol index value; and
updating the current aggregated expected symbols' size, $\text{Size}_{exp}$, with the symbol size, $\text{Size}_{sym}$, in response to symbol awareness signal, SAS.

18. The method according to claim 16, further comprising:
providing a size table returning the symbol size, $\text{Size}_{sym}$, of the currently transferred symbol based on the cyclic prefix type, the symbol index value and a preconfigured bandwidth.

19. The method according to claim 13, further comprising:
resetting the current aggregated transactions' size, $\text{Size}_{trans}$, and the current aggregated expected symbols' size, $\text{Size}_{exp}$, in response to detecting a boundary of radio frame.

20. The method according to claim 13, further comprising:
receiving the cyclic prefix type for the current sub-frame in advance of the transfer of the first symbol of the current sub-frame.

* * * * *